United States Patent [19]

Hanslik

[11] Patent Number: 5,661,888

[45] Date of Patent: Sep. 2, 1997

[54] APPARATUS AND METHOD FOR IMPROVED OILFIELD CONNECTIONS

[75] Inventor: Kenneth J. Hanslik, Pearland, Tex.

[73] Assignee: Exxon Production Research Company, Houston, Tex.

[21] Appl. No.: 478,282

[22] Filed: Jun. 7, 1995

[51] Int. Cl.⁶ .................................................. B23Q 17/00
[52] U.S. Cl. ...................... 29/407.02; 29/407.1; 29/714; 29/720; 33/833
[58] Field of Search .................... 29/407.01, 407.02, 29/407.05, 407.09, 407.1, 456, 237, 240, 705, 714, 719, 720, 721; 33/833, 832, 838, 529

[56] References Cited

U.S. PATENT DOCUMENTS

| | | | |
|---|---|---|---|
| 4,127,927 | 12/1978 | Hauk et al. | 29/407.02 |
| 4,597,150 | 7/1986 | Fister et al. | 29/407.02 |
| 4,614,120 | 9/1986 | Fradin et al. | 29/407.02 |
| 4,641,410 | 2/1987 | Plaquin et al. | 29/407.05 |
| 4,738,145 | 4/1988 | Vincent et al. | 29/407.02 |
| 4,776,102 | 10/1988 | Carroll | 33/833 |
| 4,835,873 | 6/1989 | Weems | 33/529 |
| 4,962,579 | 10/1990 | Moyer et al. | 29/407 |
| 4,964,305 | 10/1990 | Raulins | 29/407.05 |
| 4,977,685 | 12/1990 | Shahlapour | 33/833 |
| 5,040,827 | 8/1991 | Delange | 285/1 B |
| 5,233,742 | 8/1993 | Gray et al. | 29/456 |
| 5,321,506 | 6/1994 | Sargent | 348/95 |

*Primary Examiner*—David P. Bryant
*Attorney, Agent, or Firm*—Gilbreth & Strozier, P.C.; J. M. (Mark) Gilbreth; Robert W. Strozier

[57] ABSTRACT

A device for positioning two threaded pipes being threaded together within a target range of relative axial positions, which device generally includes a sensor base, and a calibrating device for positioning the sensor base a calibrated distance from the end of one of the pipes. The device further includes a sensor head extending from the sensor base, for abutting the end of the second threaded pipe during the threading of the pipes together, to indicate a relative axial position of the pipes. The device even further includes a signal generator that generates a signal once the sensor head indicates the relative axial position of the pipes are within the target range of relative axial positions.

12 Claims, 4 Drawing Sheets

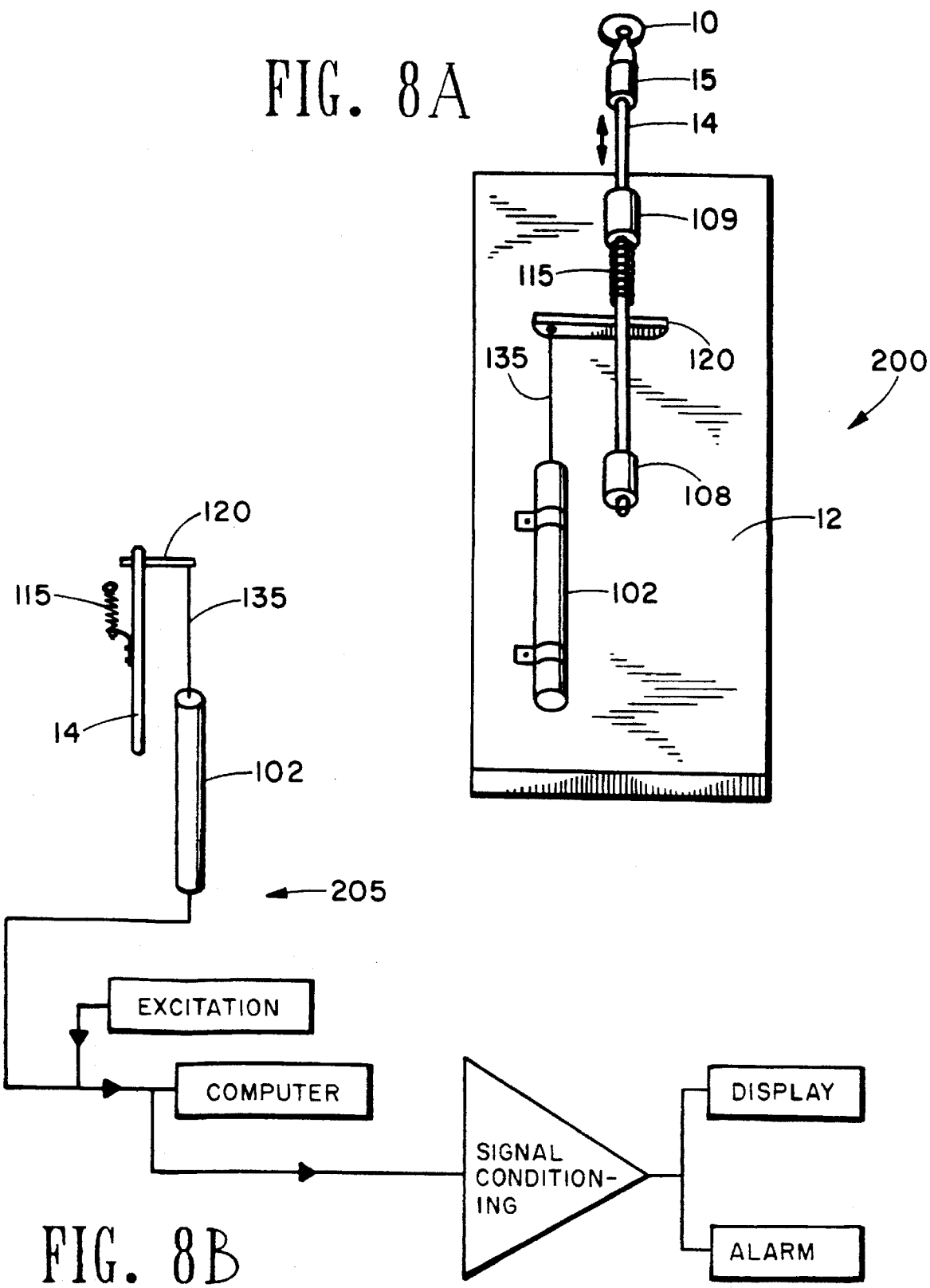

APPARATUS AND METHOD FOR IMPROVED OILFIELD CONNECTIONS

BACKGROUND OF THE INVENTION

1. Field of the Invention

The present invention relates to apparatus for and methods of making up threaded connections for tubular goods. In another aspect, the present invention relates to apparatus for and methods of making up non-shouldered threaded connections for oilfield tubular goods. In another aspect, the present invention relates to an apparatus for and method of making up non-shouldered threaded connections manufactured according to relatively broad tolerances, to form connections having reliable pressure sealing.

2. Description of the Related Art

Threaded connections for oilfield tubular goods, for example to connect oilfield casing and tubing, can be generally characterized either as expensive or low cost connections.

The expensive connections, generally referred to as premium connections, are manufactured according to relatively stringent tolerances, and include numerous types of connections which typically have at least one "make up" shoulder, which limits the torqued rotation of the threaded male/female members. These premium connections typically also include tapered sealing surfaces which help to ensure that a reliable pressure seal between the male and female members has been obtained.

Premium connections are on the order of about 5 to about 10 times more expensive than low cost threaded connections. Thus, while premium connections are believed to perform superior to low cost connections, the lower-cost American Petroleum Institute ( "API") connections are still widely used in the oilfield, particularly in recent years during which increased emphasis has been placed on the cost of equipment used to recover oil and gas from subterranean formations.

Low cost threaded connections are manufactured according to established API specifications, and generally include an externally threaded pin and an internally threaded box or coupling.

One disadvantage with the lower cost API connections, is the lack of a shoulder to limit the torqued rotation of the threaded male/female members. Without this shoulder to limit the torqued rotation, these connections can be torqued to a distance past the proper thread engagement point, resulting in an improper sealing at the connection.

Another disadvantage with the lower cost API connections relates to the rather broad tolerances allowed by API for an externally threaded pin and an internally threaded box or coupling to comply with API thread specifications. This broad tolerance allows pins and couplings to be made up or threaded together in a manner whereby the rig hands believe that a proper pressure sealing connection has been made, when in fact the interference between the threads was insufficient to establish a fluid-tight connection once the tubular string was subject to high pressure.

The standard technique for gaging API connections is to utilize a ring and plug gage. The ring gage is screwed onto the pin (and the plug gage similarly screwed onto the box or coupling), and a measurement taken from the pin or coupling face to the gage. The allowed tolerance for the thread pitch diameter was thus expressed in inches of "standoff" from the pin or coupling face to the gage reference point. These API gages are expensive and suitable for checking only a specific sized connection.

Due to problems associated with API gaging practices, some companies have checked API threads with "proprietary" gages, which measure the actual diameter of the threads. These proprietary gages do not screw onto the threads, are not affected by the roundness of the threaded connection, and may be used to check a variety of thread sizes.

Regardless of the gaging technique utilized, API connections have a wide range of thread interference when made up to visual make-up marks on the tubular goods. A rig hand may be instructed to make up the API connections so that the box face will be axially aligned with the "last thread scratch" on the pin. This last scratch is, however, very difficult to visually detect with accuracy. Moreover, the "last scratch" does not correctly indicate the point of desired interference between the threads. If the thread is made up too far, it cannot be easily and reliably backed-out to its proper position.

Manufacturers of API buttress threads employ a make-up diamond or other marking on the pin to be used as a "bench mark" to determine if the connection is properly made up, with some operators applying their own such make-up mark. Rig hands may be instructed to make up a connection even with or a certain number of turns past this make-up diamond. While utilizing such a make-up mark is simple in concept, in actual operation difficulties are encountered. First, the mark is difficult to detect, since the mark can be easily covered by the box during the make-up operation. Also, make up of the thread may have to be halted so that pipe dope leaking from the threads onto the make-up diamond can be wiped clean for the rig hand to locate the make up mark, and this make up interruption alters the friction factors between the threads and undesirably increases galling of the threads. Finally, this method requires that a rig hand be positioned to visually sight the mark, thus requiring an additional person, and subjecting that person to a somewhat precarious situation.

Additionally, the wide tolerance range allowed by this bench mark inherently leads to a great deal of subjectivity with respect to the proper make up position.

Finally, and perhaps most important, neither the last scratch nor the bench mark technique provides a system which accurately positions the box member with respect to the end face of the pin, and the make up technique cannot be any more precise than the imprecise technique used to position the mark on the tubular goods.

The above problems have long been recognized in the industry, and accordingly many attempts have been made to improve the pressure sealing ability of API connections. Unfortunately, most of these techniques have met with limited success, in part because of they significantly increase the cost of manufacturing the connection and/or the cost and time required to perform the make up operation. One technique involves the machining of a groove in the box to accommodate a polymer seal ring. Such a groove and seal ring adds considerably to the cost of the threaded connection, and creates a need for additional parts to be shipped to the rig site where the connections are made. Also, the inclusion of the seal groove generates considerable stress in the connection, which may be detrimental to the long term reliability of the tubular string, particularly when subject to corrosive environments.

Another technique to improve the sealing ability between API connections utilizes a lubricant with a sealing material, such as Teflon bits, incorporated into the lubricant, or uses a lubricant which hardens over a period of time. Both of these techniques are designed to block the escape path of the high pressure fluid to prevent leakage past the connection. These techniques do not substantially increase the cost of the connection, but do require the rig crew to be educated to the sealing technique, and can be significantly effected by various rig environments. For example, when drilling mud is back-flowing up through the tubular as it is run into the well, the mud can prevent the proper application and/or curing of these lubricants. Also, the ability of the connection to better withstand high pressure can be improved by specifying tighter tolerance for the connection, although this approach again increases the cost of manufacturing the tubular connections and does not guarantee that the connection is going to be properly made up at the rig site.

In recent years, various techniques have been designed to measure the torque and turns on the connection to improve the sealing ability of API threads. Such a torque/turn technique may be computer monitored during the make up operation, so that the tong which controlled the make up was deactivated in response to the torque/turn system. This technique considerably increases the cost of the equipment at the well site, and generally requires the use of highly trained personnel. Moreover, the scheduling of torque/turn personnel has to be arranged with other equipment and procedures involved in running tubulars into a well, which may therefore complicate the drilling or completion operations, and thus increase operating cost. Although the torque/turn technique is widely used, it is sensitive to friction, lead, taper and shape of the thread, and to environmental factors unique to the well site, such as rig alignment and crew education.

An article in the October 1989 Petroleum Engineer International magazine discusses some of the disadvantages of using the "last scratch" technique for making up API connections. The article discloses that the actual tolerances for threads according to API gaging techniques varies more widely than had been recognized by many people in the art. The article suggests gaging each pin and box with a proprietary gage, and writing pitch diameter error on the actual pin or coupling measured. When the connection is made up, the tong operator may make a mental calculation to determine how much extra connection rotation is required based upon the mismatch between the undersized pin and the oversized box. Although the last page of the article suggests a matrix to simplify the tong operator's calculation, the proposed technique has not been widely accepted in the industry. In particular, it is believed that oilfield operators recognize that tong operators are frequently too busy with other tasks to utilize mismatch dimensions or a matrix. It is difficult for a tong operator to determine with precision the number of "extra turns" which have occurred, and the suggested technique is not sufficiently simple and reliable to be accurately and reliably used by tong operators.

U.S. Pat. No. 4,127,927 discloses a different technique for making up API threads of oilfield tubular goods. This patent recognizes the advantages of the standard and established API threads, and the API standards discussed therein are hereby incorporated by reference. This patent proposes using ring and plug gages rather than the "proprietary" gages which actually measure pitch diameter. According to the disclosure of this patent, reference lines may be applied on the outer diameter of the tubular goods using the ring and plug gages to locate these lines. Accordingly, a line would be placed on the outer diameter of the pin as a function of the gaging technique, and the position of the reference line with respect to the face end of the pin would thus vary from one pin to the next pin. The patent suggests that the coupling pin could be made up so that the coupling face was always at a predetermined position with respect to the reference line on the pin. Accordingly, a make up card with a single wide slot is used, and the reference line on the pin can be monitored with respect to the coupling during the make up process. The technique disclosed in this patent likewise has not been widely accepted in the industry, in part because it utilizes the API gaging technique and, therefore, does not insure that API connections are made up with the interference which will reduce or eliminate the likelihood of pressure seal loss through the threaded connection.

U.S. Pat. No. 5,040,827, discloses an improved method of making up a pressure sealing threaded connection for oilfield tubular goods, in which the actual pitch diameter of the pin thread and the box thread are measured and preferably recorded on the outer cylindrical surface of each respective member. An indicator is positioned on the pin member at a preselected location with respect to the pin face end surface. The pin member and box member are made up to form the threaded connection, while the position of the box face end surface is monitored. Make-up of the connection is terminated in response to this position and as a function of the recorded deviations on the pin and box members.

The disadvantages of the prior art are overcome by the present invention, and improved methods and apparatus are hereinafter disclosed for reliably making up an oilfield tubular goods connection which will achieve the desired interference between the pin and box threads during the make up operation and reduce or eliminate the pressure seal loss.

SUMMARY OF THE INVENTION

According to one embodiment of the present invention there is provided an apparatus for positioning a first threaded pipe having a threaded end and a second threaded pipe having a threaded end, within a target range of relative axial positions, during the threading of the pipes together to form a tubular joint. The apparatus includes a sensor base and a calibrating device for positioning the sensor base on the first pipe at a calibrated distance from the end of the first pipe. The apparatus further includes a sensor head extending from the sensor base, for abutting the end of the second threaded pipe during the threading of the pipes together, to indicate a relative axial position of the pipes. The apparatus even further includes a signal generator that generates a signal once the sensor head indicates that the relative axial position of the pipes are within the target range of relative axial positions.

According to another embodiment of the present invention there is provided a method for positioning a first threaded pipe having a threaded end and a second threaded pipe having a threaded end within a target range of relative axial positions, during the threading of the pipes together to form a tubular joint. The method includes attaching a calibrating device on end of the first pipe wherein the calibrating device comprises a platform positioned at a calibrated distance from the end of the first pipe. The method further includes placing a sensing device on the platform adjacent the first pipe, wherein the sensing device comprises a sensor head extending from the sensor base, for abutting the end of the second threaded pipe during the threading of the pipes together, to indicate a relative axial position of the pipes. Next, the method includes securing the sensing device to the first pipe, and then removing the calibrating device.

Finally the pipes are threaded together to form a joint, until abutment of the sensor head with the end of the second threaded pipe indicates the relative axial position of the pipes are within the target range of relative axial positions. A signal is generated once the relative axial position of the pipes are within the target range of relative axial positions.

BRIEF DESCRIPTION OF THE DRAWINGS

FIG. 8A and 8B are schematic representations of signalling system 200, and of electrical system 205 of system 200.

DETAILED DESCRIPTION OF THE INVENTION

The present invention will now be described by reference to FIGS. 1 through 6.

Figure 1:
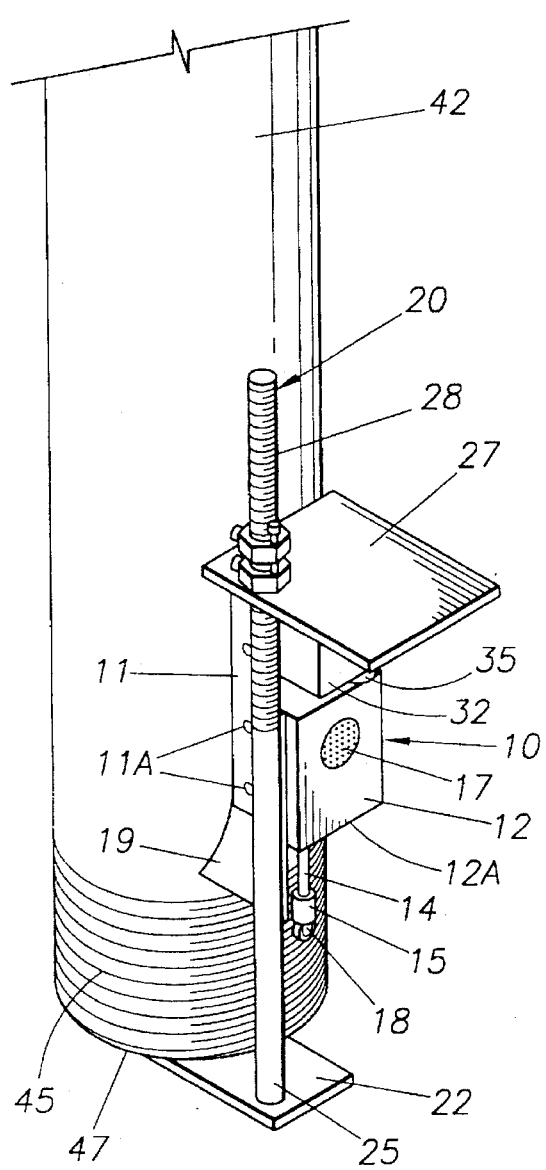
FIG. 1 is an illustration showing monitoring apparatus 10 of the present invention mounted on threaded pipe 42 utilizing calibrating member 20, with monitoring apparatus 10 including sensor base 12, magnetic coupling 32, wiper blade 19, and sensor head 15.

Referring first to FIG. 1 there is shown an illustration of monitoring apparatus 10 for making up a threaded connection from oilfield tubular goods, and includes coupling member 32, sensor base 12 and calibrating member 20. Monitoring apparatus 10 is shown mounted on threaded pipe 42, having threads 45 and a top end 47.

Magnetic coupling member 32 is a magnetic-type coupling which is engaged by turning knob 35 to position a magnet within magnetic coupling 32 in proximity to threaded pipe 42. Of course, while magnetic coupling 32 is shown as a magnetic-type coupling, any suitable coupling mechanism suitable for holding monitoring apparatus 10 affixed to threaded pipe 42 may be utilized, including a strap around pipe 42.

Sensor base 12 includes a plunger arm 14 which is movable into and out of sensor base 12 through top 12A. Positioned at the end of plunger 14 is sensor head 15, having roller 18. Plunger arm 14 is biased away from sensor base 12 by an internal biasing mechanism, such as a spring, into an upright position as shown. Sensor base 12 further includes wiper blade 19 and speaker 17.

Sensor base 12 and magnetic coupling 32 are secured to support members 11 by fasteners 11A to form a unit.

Calibrating member 20 includes pipe engagement member 22, sensor base platform 27, and rod 25. Engagement member 22 is positioned against end 47 of threaded pipe 42, with rod 25 extending downwardly from engagement member 22 and supporting sensor base platform 27 at a desired position along threaded pipe 42. Calibrating member 20 cannot remain positioned against end 47 of threaded pipe 42, as it would prevent another threaded pipe from coupling with pipe 42. Thus, once monitoring apparatus 10 has been secured in place with magnetic coupling 32, calibrating member 20 is removed, generally by sliding it away from threaded pipe 42.

Figure 2:
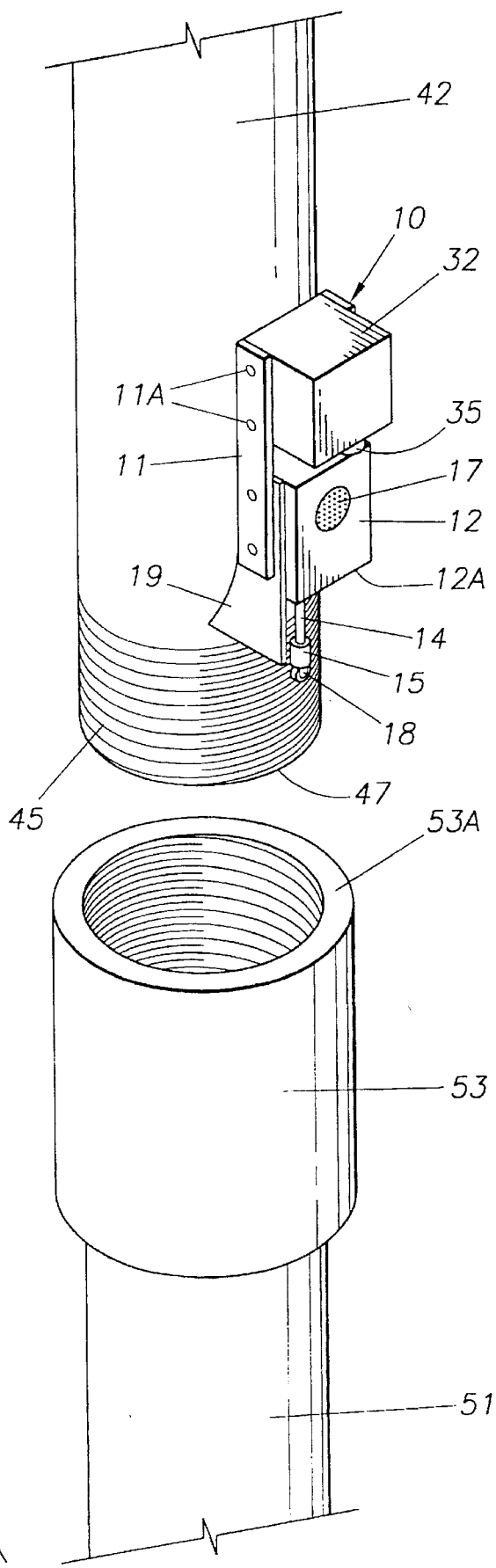
FIG. 2 is an illustration showing monitoring apparatus 10 of the present invention mounted on threaded pipe 42 without calibrating member 20, including sensor base 12, magnetic coupling 32, wiper blade 19, and sensor head 15, and showing threaded pipes 42 and 51 in axial alignment to be threaded together.

Referring additionally to FIG. 2, there is shown an illustration of monitoring apparatus 10 of the present invention after calibration member 20 has been removed, with threaded pipe 42 and threaded pipe 51 positioned in axial alignment to be threaded together. Threaded pipe 51 includes pipe coupling section 53 having internal threads for engaging threads 45 of threaded pipe 42 and the threads of pipe 51 (not shown). Coupling section 53 is attached to pipe 51 in advance of the operation of the present invention. Pipe coupling 53 provides shoulder 53A for engaging roller 18 of sensor head 15 as pipes 42 and 51 move axially during the threading process. Shoulder 53A of threaded pipe coupling 53 is shown in engagement with roller 18 of sensor head 15 (see FIG. 3), with sensor head 15 a distance D above sensor base 12.

Those skilled in the art appreciate that a threaded connection between threaded pipes 42 and 51 will be made up at the rig site utilizing suitable make up and break out equipment. Commonly, the connection is made up in a conventional manner utilizing a tong as is well known in the oil field art.

Figure 3:
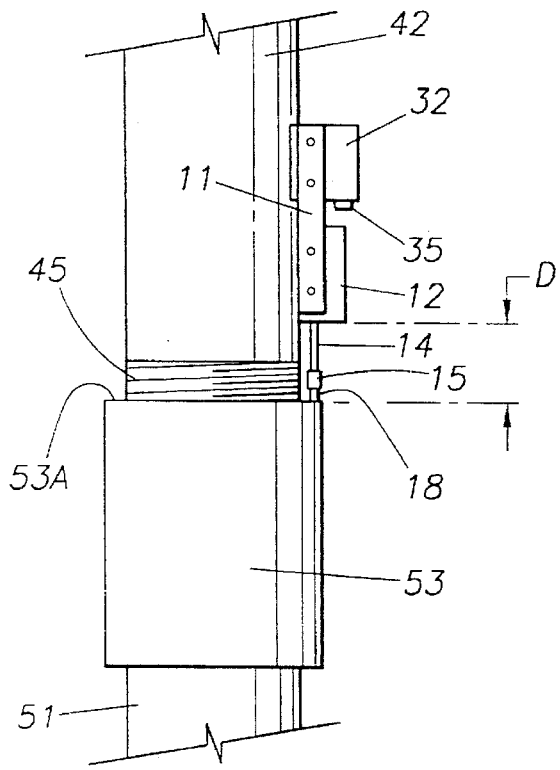
FIG. 3 is a side view of monitoring apparatus 10 of the present invention mounted on threaded pipe 42, showing engaging sensor head 15, sensor base 12, magnetic coupling 32, plunger 14, sensor head 15 and sensor roller 18, and showing threaded pipes 42 and 51 partially threadably engaged.

Referring additionally to FIG. 3 there is shown a side view of monitoring apparatus 10 of the present invention, with threaded pipe 42 and threaded pipe 51 partially threadably engaged. During the threading process, threaded pipes 42 and 51 move axially and circumferentially relative to each other, causing shoulder 53A of pipe coupling 53 to engage roller 18 as shown. Roller 18 is provided to reduce friction between shoulder 53A and sensor head 15 as threaded pipes 51 and 42 move circumferentially relative to each other during the threading process.

The axial movement together of threaded pipes 42 and 51, causes shoulder 53A to engage plunger arm 14 and overcome the biasing to move plunger arm 14 into sensor base 12. The movement of plunger arm 14 engages a switch mechanism in sensor base 12 to generate an indication signal once a desired target range of axial positions is reached.

A thread lubricant, generically known as "pipe dope", is applied to threads 45 and 53 of pipes 42 and 51 to aid in the threading operation. This pipe dope will tend to be forced from the threads and down onto threaded pipe 42 as threaded pipes 42 and 51 move together axially. The rotational motion of threaded pipe 51 during the threading process, can force pipe dope onto monitoring apparatus 10. Wiper blade 19 is a resilient pliable member that contacts pipe coupling 53 and directs such pipe dope away from monitoring apparatus 10.

Figure 4:
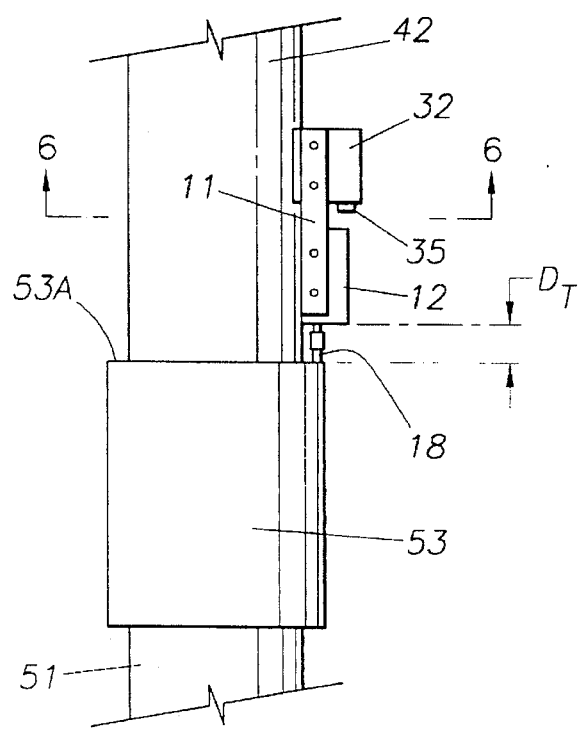
FIG. 4 is a side view of monitoring apparatus 10 of the present invention mounted on threaded pipe 42, showing engaging sensor head 15, sensor base 12, magnetic coupling 32, plunger 14, sensor head 15 and sensor roller 18, and showing threaded pipes 42 and 51 threadably engaged via pipe coupling 53.
Figure 6:
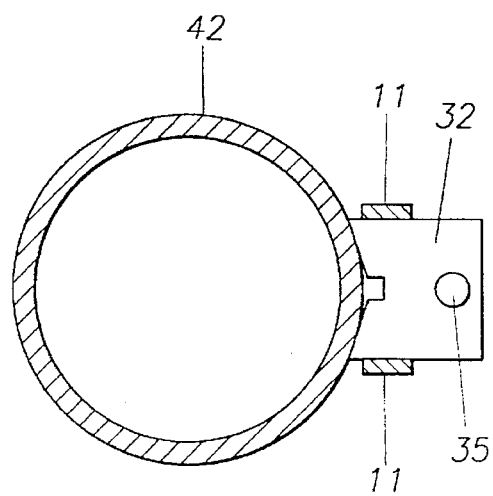
FIG. 6 is a top view of magnet coupling 35 magnetically secured to threaded pipe 42, taken at 6—6 of FIG. 3.

Referring additionally to FIGS. 4 and 6, there is shown in FIG. 4 a side view of monitoring apparatus 10 of the present invention, with threaded pipe 42 and threaded pipe 51 further threadably engaged as compared to FIG. 3, and shown in FIG. 6 a top view of magnet coupling 35 magnetically secured to threaded pipe 42, taken at 6—6 of FIG. 3.

Continuing the threading process from FIG. 3, threaded pipes 42 and 51 continue to move axially relative to each other, causing shoulder 53A of pipe coupling 53 to move plunger arm 14 further into sensor base 12. The further movement of plunger arm 14 engages a switch mechanism in sensor base 12 to generate an indication signal at the desired target range of axial positions, $D_T$. In the embodiment shown, the target range of axial positions is set internally in sensor base 12.

If this desired target range of axial positions has not been provided by the manufacturer, or not otherwise known, it can be easily determined by experimentation for each type and size of tubular goods. Generally, such experimentation involves making a tubular connection to various known axial positions, and then testing the connections. As it is generally not practical to experimentally determine the desire axial position during well operations, a preferred method is to have the desired target range of axial positions available prior to the operation of making up the tubular connection. Thus, for a given type and size of pipe, the well crew will be instructed ahead of time the desired target range of axial positions to which the tubular connection is to be made.

Any suitable indication signal may be generated once threaded pipes 42 and 51 are oriented within the desired target range of axial positions. For example, an auditory, visual or vibratory signal could be generated to inform the tong operator to stop operation of the tong. In the embodiment shown, sensor base 12 further includes speaker 17 for emitting an auditory signal to inform the tong operator to stop operation of the tong. It is to be understood that a light or set of lights could be substituted for speaker 17. Such lights could be utilized in any manner to inform an operator to stop operation of the tong. Most simply, if one light is utilized, the light could either turn off, on or blink to indicate proper axial alignment is reached. If two lights are utilized, one could indicate "go" and the other "stop", which signals be correlated to colors or signage.

Figure 7A:
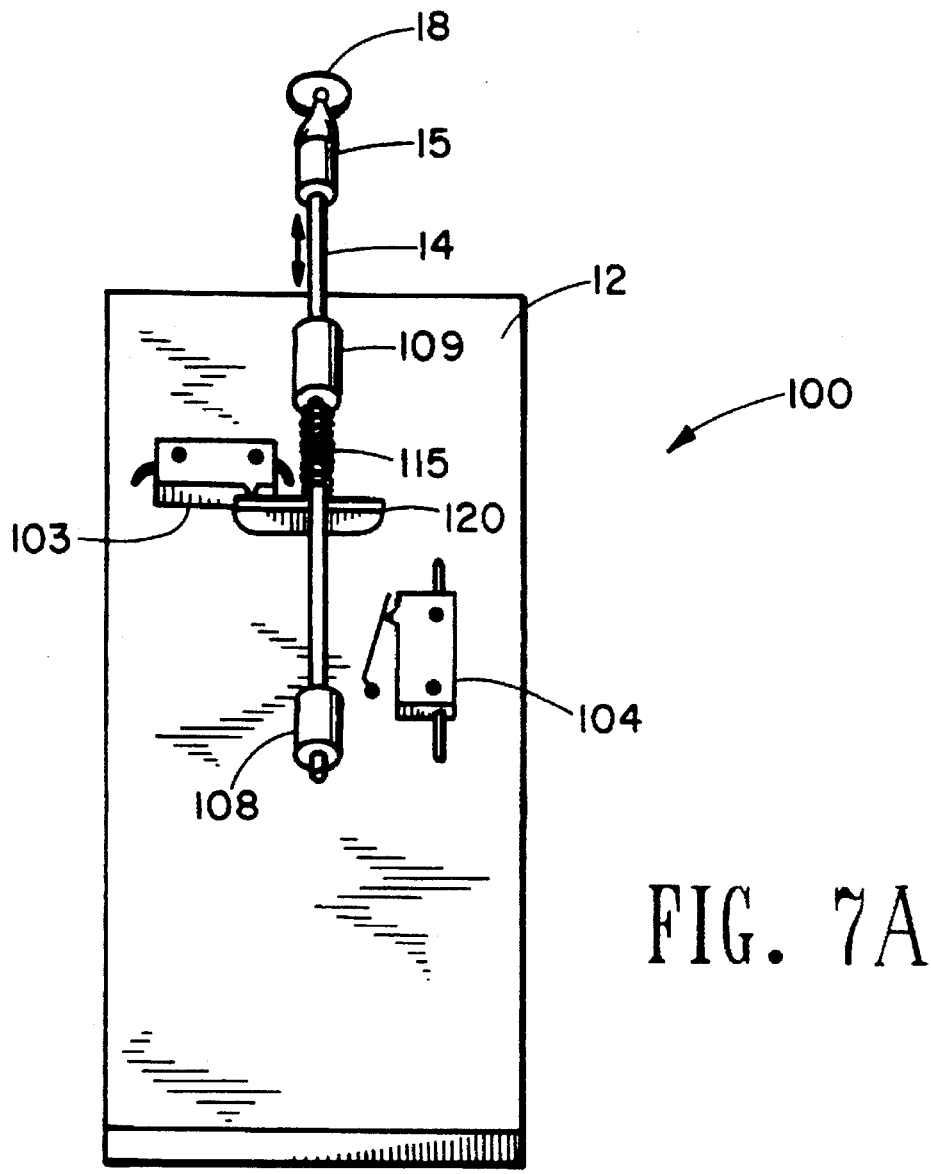
FIG. 7A is a schematic representation of the signalling system 100 positioned within sensor base 12.
Figure 7B:
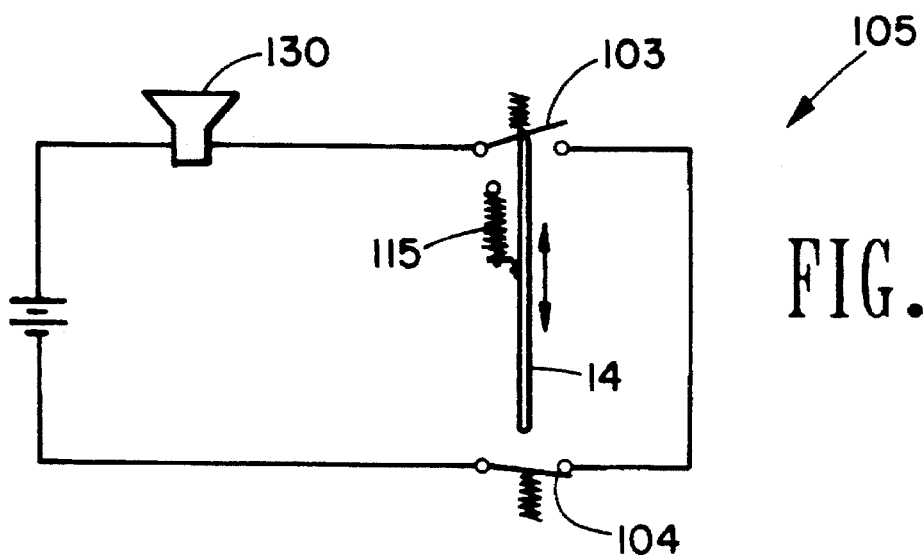
FIG. 7B is an electrical schematic 105 of signalling system 100.

Referring now to FIG. 7A there is shown a schematic representation of the signalling system 100 positioned within sensor base 12. Referring additionally to FIG. 7B, there is shown an electrical schematic 105 of signalling system 100. Plunger 14 travels within retaining rings 108 and 109. Spring 115 biases plunger 14 to keep contact 120 against limit switch 103. As plunger 14 moves downwardly, it will first disengage from limit switch 103 and sound an alarm 130, and then engage limit switch 104 with contact 120 to stop the alarm 130.

As another example of an indication signal, a wireless signal could be transmitted to a pager-type device worn by the tong operator so that the pager either vibrates or emits an auditory signal to inform the operator to stop operation of the tong.

As still another example of an indication signal, an analog device, such as a linear variable differential transducer ("LVDT"), which provides a variable output as a function of linear movement, could be utilized. Referring now to FIG. 8A and 8B, there is shown a schematic representation of signalling system 200, and of electrical system 205 of system 200. Switch 102 is an LVDT which upon linear movement of rod 135 produces a signal that is a function of the linear movement.

One drawback with signaling the tong operator, is that some lag time will occur between the time the tong operator receives the signal and reacts. Alternatively, instead of signaling the tong operator to stop operation of the tong, a signal may be generated and transmitted directly to the tong controls to stop operation of the tong. While such signals may be transmitted to the tong control via wires, cable and the like, it is preferred that wireless transmission, such as IR or radio frequency, be utilized.

Figure 5:
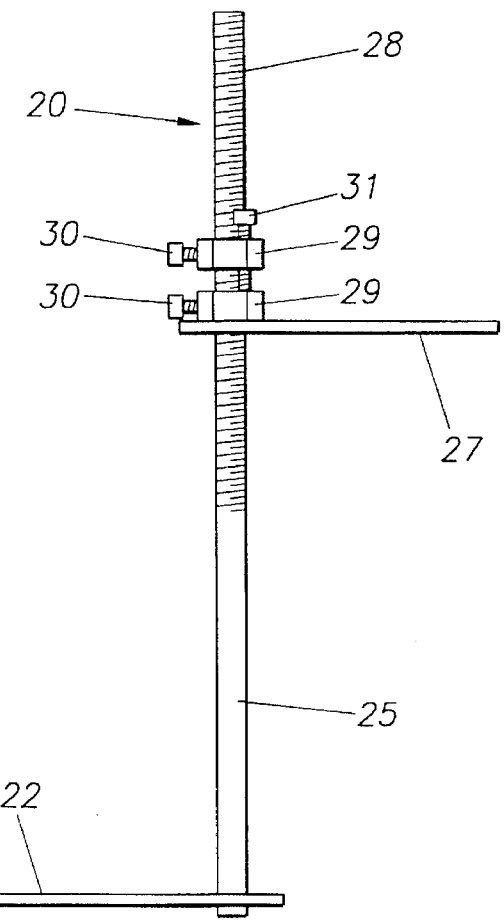
FIG. 5 is a side view of calibrating member 20, including pipe engagement member 22, sensor base platform 27, rod 25, calibration scale 28, and fastening member 29.

Referring additionally to FIG. 5, there is shown a detailed illustration of the calibration member 20, including pipe engagement member 22, sensor base platform 27, rod 25, calibration scale 28, and fastening members 29A and 29B. Fastening members 29A and 29B linearly traverse rod 25, with fastening member 29B connected to platform 27. The distance between engagement member 22 and platform 27 can be set utilizing calibration scale 28, or by measuring the distance by any other suitable means, including a ruler. The distance between engagement member 22 and platform 27 is adjusted by loosening set screws 30 of fasteners 29A and 29B and moving platform 27 along calibration scale 28. Once platform 27 is near the desired position, fastener 29A is locked into place with its set screw 30, with fine adjustments made using fine adjustment 31 to precisely move fastener 29B and platform 27 relative to fastener 29A.

In operation, the necessary position for placement on threaded pipe 42 of monitoring apparatus 10 is first determined, provided or otherwise known. Next, calibration member 20 is adjusted as described above, and positioned on threaded pipe 42 with engagement member 22 positioned on end 47 as shown in FIG. 1. Monitoring apparatus 10 is then positioned on platform 27 as shown in FIG. 1, and magnetic coupling 32 engaged with switch 35. Calibration member 20 is then removed to leave monitoring apparatus connected as shown in FIG. 2. The threading of pipes 42 and 51 then proceeds until monitoring apparatus 10 emits a signal indicating that the pipes 42 and 51 are within the target range of axial orientations.

The present invention eliminates the need to provide markings on tubular goods in the making of a tubular connection in order to determine when the connection is properly torqued. Marking a tubular requires that the tubular first be cleaned and prepared, then painted or otherwise marked, a process which takes a certain amount of time. As the present invention eliminates the need to provide markings on tubular goods, the cleaning and marking of the tubular is also eliminated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. An apparatus for positioning a first threaded pipe having an externally threaded end and a second threaded pipe having an internally threaded end within a target range of relative axial positions, during the threading of the pipes together to form a tubular joint, the apparatus comprising:

(a) a sensor base;

(b) an adjustable calibrating device for positioning the sensor base on the first pipe within an adjustable range of distances from the end of the first pipe;

(c) a sensor head extending from the sensor base, for abutting the end of the second threaded pipe during the threading of the pipes together, to indicate a relative axial position of the pipes;

(d) a signal generator that generates a signal once the sensor head indicates that the relative axial position of the pipes is within the target range of relative axial positions.

2. The apparatus of claim 1 further comprising an attachment member connected to the base, that attaches the base to the first pipe.

3. The apparatus of claim 1 further comprising a wiper attached to the base and positioned to contact the second threaded pipe during the threading of the pipes together.

4. The apparatus of claim 1 wherein the sensor head is attached on a plunger biased away from and retractable into the sensor base.

5. The apparatus of claim 4 wherein the sensor head comprises a roller.

6. The apparatus of claim 1 wherein the signal generator emits an audio tone once the sensor head indicates that the relative axial position of the pipes is within the target range of relative axial positions.

7. The apparatus of claim 1 wherein the calibrating device comprises an engagement member for engaging the end of the first pipe, a platform for holding the sensor base, and a support member joining and maintaining the engagement member and the platform at a calibrated distance apart within the adjustable range of distances.

8. The apparatus of claim 1 further comprising an attachment member connected to the base, that attaches the base to the first pipe, wherein the sensor head comprises a roller, and wherein the sensor head is attached on a plunger biased away from and retractable into the sensor base, and wherein the calibrating device comprises an engagement member for engaging the end of the first pipe, a platform for holding the sensor base, and a support member joining and maintaining the engagement member and the platform at a calibrated distance apart within the adjustable range of distances.

9. A method for positioning a first threaded pipe having an externally threaded end and a second threaded pipe having an internally threaded end within a target range of relative axial positions, during the threading of the pipes together to form a tubular joint, the method comprising:

(a) attaching an adjustable calibrating device on the end of the first pipe wherein the calibrating device includes a platform positionable within a range of distances from the end of the first pipe;

(b) adjusting the adjustable calibrating device to position the platform a calibrated distance within the range of distances from the end of the first pipe;

(c) placing a sensing device on the platform adjacent the first pipe, wherein the sensing device comprises a sensor head extending from a sensor base, for abutting the end of the second threaded pipe during the threading of the pipes together, to indicate a relative axial position of the pipes;

(d) securing the sensing device to the first pipe;

(e) removing the calibrating device;

(f) threading the pipes together to form a joint, until abutment of the sensor head with the end of the second threaded pipe indicates the relative axial position of the pipes is within the target range of relative axial positions.

10. The method of claim 9 further comprising generating a signal once the relative axial position of the pipes are within the target range of relative axial positions.

11. The method of claim 10 wherein the signal generated is an auditory signal.

12. The method of claim 10 wherein the signal generated terminates the threading of the pipes together.

* * * * *